Feb. 10, 1959

F. C. SMITH 2,873,306

HEARING AID

Filed May 8, 1956

INVENTOR.
FREDERIC C. SMITH
BY
ATTORNEY.

Feb. 10, 1959 F. C. SMITH 2,873,306
HEARING AID
Filed May 8, 1956 2 Sheets-Sheet 2

INVENTOR.
FREDERIC C. SMITH
BY Louis Necho
ATTORNEY.

United States Patent Office 2,873,306
Patented Feb. 10, 1959

2,873,306

HEARING AID

Frederic C. Smith, Philadelphia, Pa.

Application May 8, 1956, Serial No. 583,531

1 Claim. (Cl. 174—52)

This invention relates to a hearing aid of the type disclosed in Patent No. 2,613,282 issued on October 1, 1952 to A. M. Scaife in which the hearing aid is combined with, or is incorporated in, the frame of a pair of conventional eye glasses.

To incorporate a hearing aid in the frame of a pair of eye glasses, the temple pieces are made somewhat larger so as to receive the battery, the transistors, the microphone and the speaker, and the wires which interconnect these parts are run in the frame which supports the lenses. When the hearing aid is to be used in the left ear, the speaker will be located near the end of the temple piece which fits over the left ear and vice versa. Except for this requirement, the distribution of the parts of the hearing aid is a matter of balance and expediency and is of no special interest to the present disclosure.

My experience in the field of fitting, selling and servicing hearing aids has shown that the repeated folding and unfolding of the temple pieces relative to the lens frame breaks the wires which connect the parts in one temple piece with the parts in the other temple piece, thus causing inconvenience and expense.

It is therefore the object of the invention to produce an improved construction whereby the breaking of the wires at the junction of the temple pieces with the lens frame is eliminated.

The nature of this invention will be understood from the following specification and the accompanying drawings in which.

Figure 1:
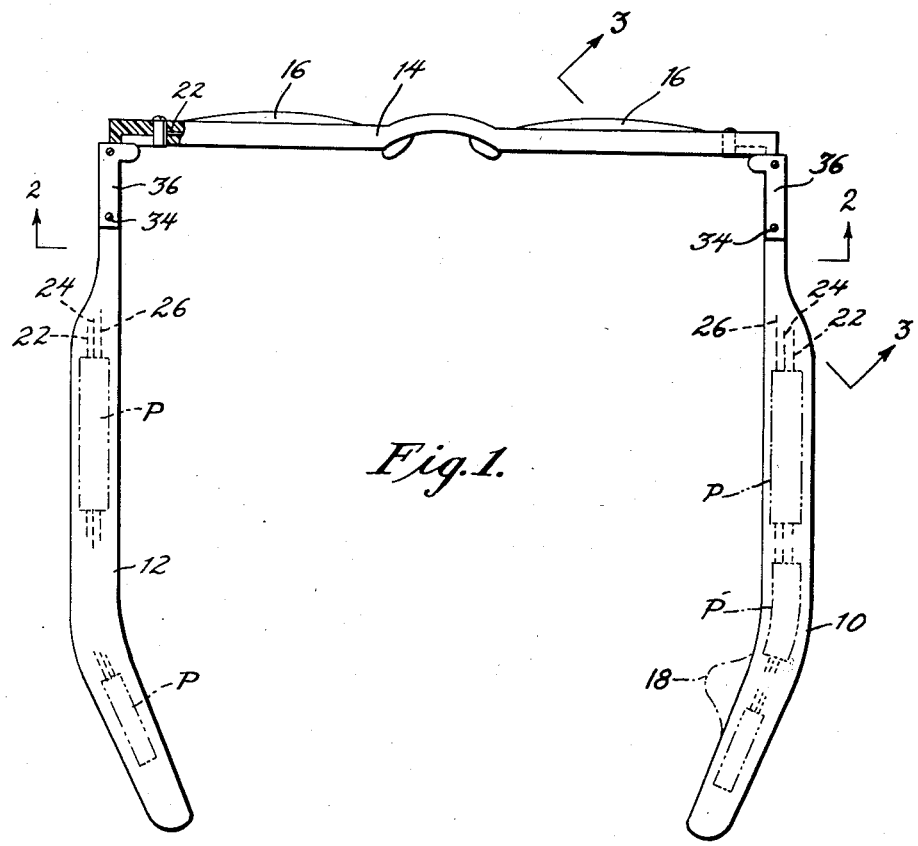
Fig. 1 is a top plan view of a hearing aid incorporated in the frame of an apparently conventional pair of eyeglasses.
Figure 2:
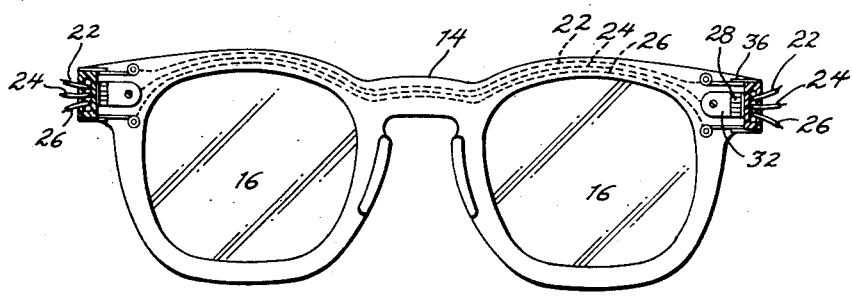
Fig. 2 is a sectional view looking in the direction of line 2—2 on Fig. 1.

In the drawings, there is shown a pair of eye glasses including a right temple piece 10, a left temple piece 12 and an intermediate frame 14 for holding the lenses 16. Within the temple pieces are suitably disposed the battery, the transistors, the pick-up microphone, the speaker, etc., which constitute a hearing aid. These parts are conventional and therefore are not fully shown nor described. For identification these parts are indiscriminately referred to by the letter P. Furthermore, these parts, or their equivalents, are shown in the Scaife patent aforesaid and in other patents. Since they form no part of the present invention, it is sufficient to say that the ear piece, or speaker, 18 is located in that portion of the temple piece which fits over the ear to which the hearing aid is to be applied. The parts P in temple piece 10 are connected to parts P in temple piece 12 by wires 22, 24 and 26 which pass through the frame 14 of the lenses 16 as best shown in Fig. 2 and due to the repeated folding and un-folding of the temple pieces relative to the lens frame, these wires break with annoying frequency.

Figure 3:
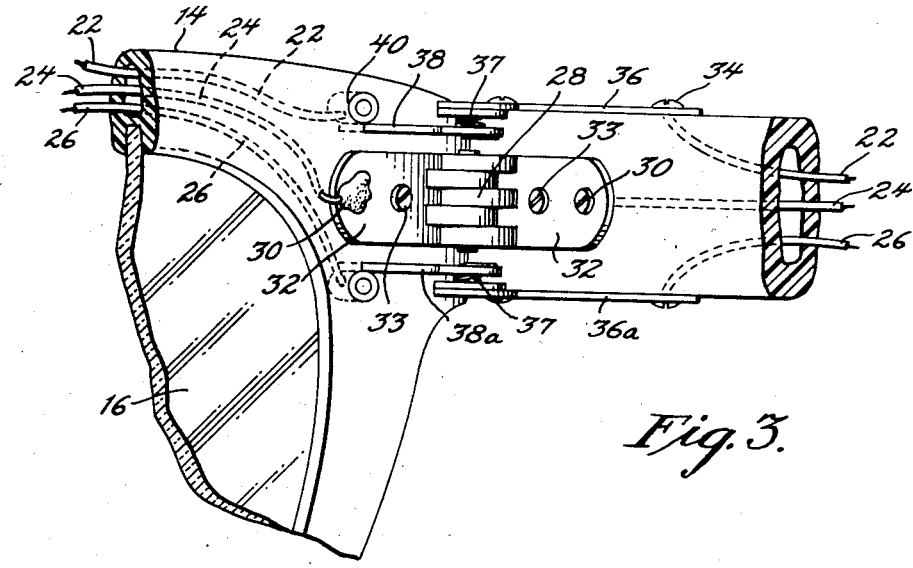
Fig. 3 is an enlarged fragmentary view looking in the direction of line 3—3 on Fig. 1.
Figure 4:
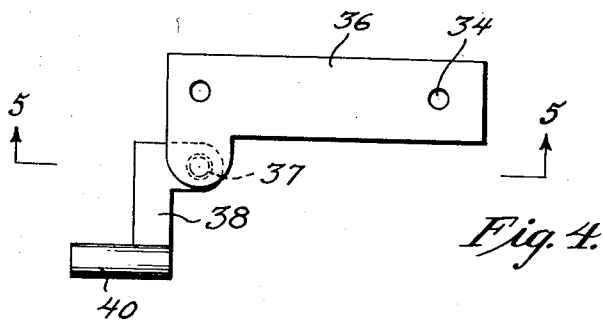
Fig. 4 is an enlarged top plan view of one of the two hinge brackets which are used at the junction of each of the temple pieces with the adjacent lens frame.
Figure 5:
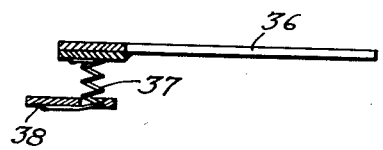
Fig. 5 is a sectional view looking in the direction of line 5—5 on Fig. 4.

In order to overcome this difficulty, I utilize the conventional hinges 28 which connect the temple pieces to the adjacent ends of the lens supporting frame as conductors electrically to connect the portions of wire 24 which extend through the temple pieces with the portion of this wire which extends through the lens frame. This arrangement is best shown in Fig. 3 from which it will be seen that these juxtaposed ends of wire 24 are connected, at 30, to the straps 32 of hinge 28. Straps 30 and 32 are suitably secured to the adjacent ends of the temple pieces and of the lens frame respectively, by screws or the like 33. From Figs. 3, 4 and 5 it will also be seen that the portions of wires 22 which extend through the temple pieces are connected, at 34 to the adjacent ends of conducting brackets 36, the other ends of which are connected by springs 37 to the ends of angle brackets 38. The other ends of brackets 38 are secured, at 40, to the adjacent ends of the portion of wire 22 which extends through the lens frame. Brackets 38 may be wholly supported by bracket 36 or they may be suitably secured to the lens frame. In either event, brackets 36 and 38 serve as binding posts and are articulated, or hingedly connected, by spring 37. By inspection of Fig. 3 it will be seen that the juxtaposed ends of wire 26 are interconnected by brackets 36a and 38a which are identical with brackets 36 and 38.

From the foregoing it will be seen that, by my invention, the wires which interconnect the parts of the hearing aid are never bent or flexed and therefore the breaking of the wires on this score is completely eliminated.

What I claim is:

A combined eye glass and hearing aid including a lens supporting frame, a pair of enlarged temple pieces containing the component parts of a hearing aid, a first wire extending through said frame, a corresponding first wire in each of said temple pieces leading from the component parts in the respective temple piece, a pair of hinges articulately connecting said temple pieces to the opposite ends of said lens supporting frame and electrically connecting said first wire in said frame with the corresponding first wires in said temple pieces, a pair of binding posts at each end of said frame, a pair of wires extending through said frame and connected to said binding posts, a coil spring carried by each of said binding posts, a pair of binding posts carried by the ends of the temple pieces adjacent said hinges, and a pair of wires extending through each of said temple pieces and connected to the binding posts carried by the corresponding temple piece.

References Cited in the file of this patent

UNITED STATES PATENTS

| 352,596 | Wilson | Nov. 16, 1886 |
| 615,209 | Baxter | Nov. 29, 1898 |
| 2,688,733 | Walters | Sept. 7, 1954 |
| 2,725,462 | Vorgang | Nov. 29, 1955 |

FOREIGN PATENTS

| 491,677 | France | Sept. 7, 1938 |
| 840,622 | France | Apr. 28, 1939 |